United States Patent [19]

Kim

[11] Patent Number: 5,689,383

[45] Date of Patent: Nov. 18, 1997

[54] APPARATUS AND METHOD FOR CORRECTING CAPSTAN LOAD IN SLOW SPEED REPRODUCTION MODE

[75] Inventor: Yong Jae Kim, Incheon, Rep. of Korea

[73] Assignee: Goldstar Co., Ltd., Seoul, Rep. of Korea

[21] Appl. No.: 366,773

[22] Filed: Dec. 30, 1994

[30] Foreign Application Priority Data

Dec. 30, 1993 [KR] Rep. of Korea .................. 31636

[51] Int. Cl.$^6$ ................................................ G11B 15/52
[52] U.S. Cl. ................................. 360/73.11; 386/81
[58] Field of Search .......................... 360/10.1, 10.3, 360/73.05, 73.11, 74.1; 358/335; 386/68, 81

[56] References Cited

U.S. PATENT DOCUMENTS

| | | | |
|---|---|---|---|
| 2,251,074 | 10/1941 | Hamma et al. | 360/14.1 |
| 4,737,864 | 4/1988 | Sekiya et al. | 360/10.1 |
| 4,811,130 | 3/1989 | Takayama | 360/73.11 |
| 4,853,809 | 8/1989 | Nemoto. | |
| 5,184,254 | 2/1993 | Kaneko et al. | 360/10.3 |
| 5,257,147 | 10/1993 | Hong. | |
| 5,317,460 | 5/1994 | Kim. | |
| 5,327,249 | 7/1994 | Lee | 360/77.12 |

Primary Examiner—W. R. Young
Assistant Examiner—Regina Y. Neal

[57] ABSTRACT

An apparatus and a method are provided for rapidly determining, without iteration, a desired value of a time interval between a head switching signal and the next capstan motor stop signal for a slow speed reproduction mode which intermittently stops a capstan motor of a video cassette recorder during a slow speed reproduction mode of a video cassette recorder. The invention allows stop points during a slow speed reproduction mode to be made independent of capstan load.

19 Claims, 6 Drawing Sheets

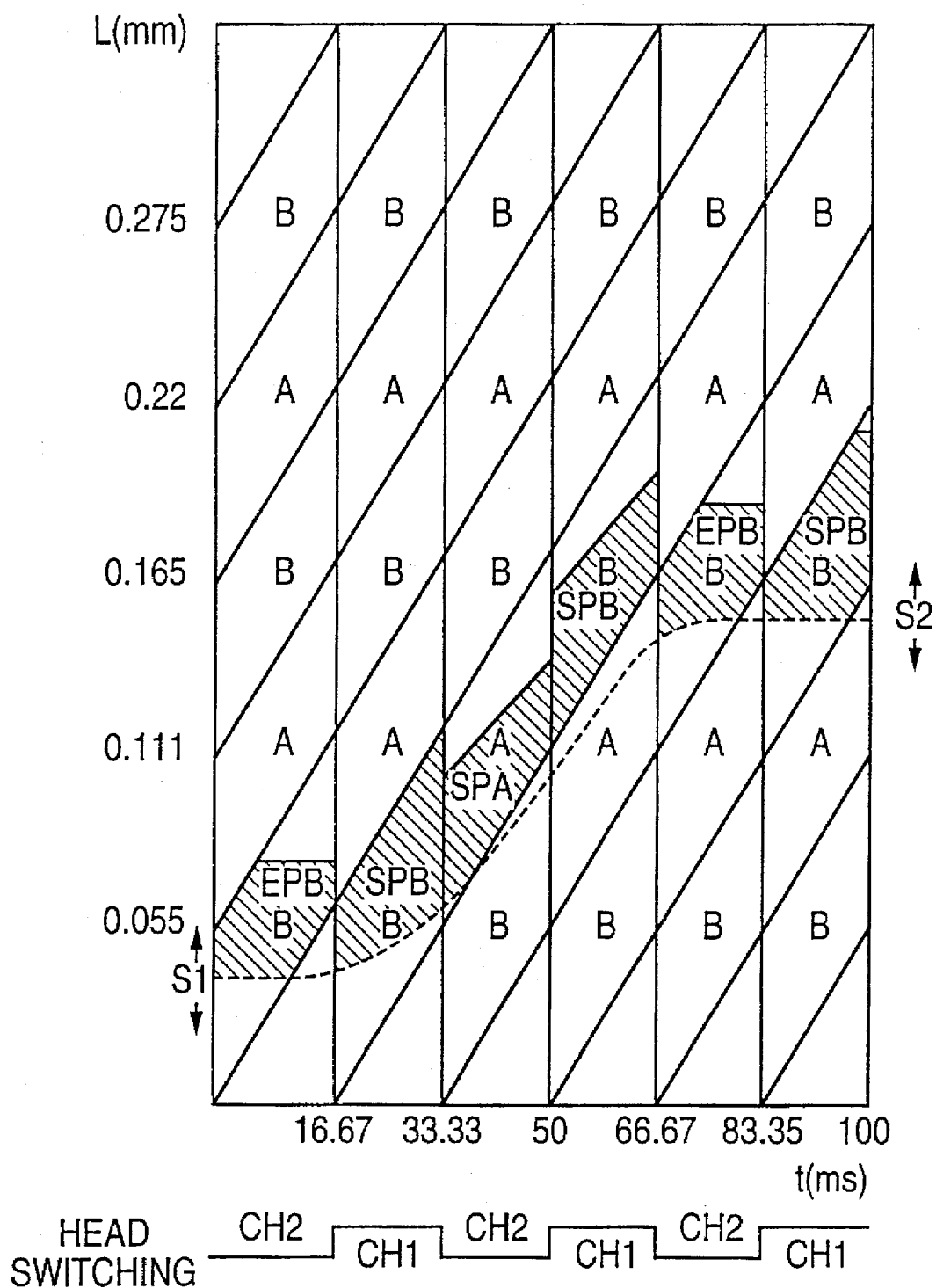

APPARATUS AND METHOD FOR CORRECTING CAPSTAN LOAD IN SLOW SPEED REPRODUCTION MODE

BACKGROUND OF THE INVENTION

The present invention relates to a deck system of a video cassette recorder (VCR), and more particularly to an apparatus and a method for correcting capstan load in a slow speed reproduction mode so as to keep stop points consistent at all times.

As shown in FIG. 1, a conventional deck system of a VCR in a slow speed reproduction mode includes (a) a servo 1 for controlling an entire system's operation, (b) a microcomputer 3 connected, through a head switching terminal and a control clock terminal respectively, to the servo 1, (c) a drum motor 2 connected, through a pulse generating amplifier 6, to a pulse generator PG of the servo 1, (d) a control head 5 connected to the control clock terminal of the servo 1, and (e) a capstan motor 4, which is connected to a slow acceleration terminal and a motor forward/reverse control terminal of the microcomputer 3 simultaneously, and connected to a capstan control terminal of the servo 1, and rotated by receiving a capstan control signal and outputting capstan frequency generating signals CFG to the servo 1.

The above-mentioned VCR carries out a slow function intermittently, repeating play, still, and play operations (hereinafter referred to as slow).

If a user commands a slow mode operation, t1, t2, t4, t5 values of FIG. 3, provided by the program of the microcomputer 3, are added by an adder A through the capstan control terminal of the servo 1 and the slow acceleration terminal of the microcomputer 3, and then are outputted to the capstan motor 4.

In FIG. 3, t1 is a time interval from the trailing edge of a head switching pulse to the leading edge of a capstan control signal, t2 is a time for actuating the capstan motor, t3 is a time interval from the starting point of the capstan motor to the point of detecting a control clock pulse, t4 is a time interval from the detection point of the control clock pulse to the input time of a stop pulse, t5 is a reverse pulse input time interval, that is, a time interval from the input of said stop pulse to the stop of the capstan motor, and t6, a time interval, is the aggregate of the t2, t3, t4, and t5 time intervals.

Because the sum signal of the capstan control signal and the motor forward/reverse control signal becomes a reverse signal, the stop pulse during the t5 time interval (shown in FIG. 3 in a slow speed reproduction mode) becomes a reverse rotation pulse and consequently a stop signal.

Among the time intervals described above, t1, t2, t4, and t5 are fixed values set by the microcomputer 3 program, and t3 is a variable value according to the load force of the deck.

If the capstan motor 4 is driven, the capstan frequency generating signals CFG are inputted from the capstan motor 4 to the servo 1. At this time, the number of the capstan frequency generating signals CFG inputted are proportional to the distance between S1 and S2 of the Y axis shown in FIG. 4A, and the control head reads a magnetic tape from S1 to S2.

In the above-mentioned conventional deck function of a VCR in a slow speed reproduction mode, since the t3 value is variable by the difference of load force of the deck mechanism, the value of t6 is variable according to the value of t3 even in the same deck, due to fixed values of t4 and t5. Accordingly, if the value t3 of is small, short, the S2 value shown in FIG. 4A moves to the lower end of Y axis and the next succeeding S1 position also moves downward. In an extreme case, noise occurs at points e and f of points of the lower end of a screen as shown in FIG. 4C. On the other hand, if the t3 value is large, the value of S2 moves to the upper end of the Y axis and the next succeeding S1 value also moves upward. In an extreme case, noise occurs at the points a, b, c, and d of the upper end of the screen as shown in FIG. 4B.

In other words, in the conventional VCR, because the positions of stop points, in a slow speed reproduction mode, vary according to the difference of load force of the deck mechanism, in a slow speed. reproduction mode, the start points in a slow speed reproduction mode are changed, thereby generating noises at the upper and lower portions of a wave diagram.

SUMMARY OF THE INVENTION

It is an object of the present invention to provide an apparatus and a method for correcting capstan load in a slow speed reproduction mode, which correct stop points in a slow speed reproduction mode according to a load difference of a deck mechanism and keep the stop points constant in a slow speed reproduction mode, thereby preventing noise.

In order to achieve the above-mentioned object, the present invention comprises a rectangular wave shaping circuit for receiving capstan frequency generating signals generated according to the rotation of a capstan motor and for shaping rectangular waves corresponding to the capstan frequency generating signals used for signals, and a microcomputer for detecting the number of the capstan frequency generating signals during a prescribed period of time by receiving the rectangular waves of the rectangular wave shaping circuit, comparing the detection result with predetermined numerals for each speed mode, having a time control function on the basis of the compared result, and controlling the capstan motor.

In accordance with the present invention, the rectangular wave shaping circuit shapes the capstan frequency generating signals of the capstan motor into the rectangular waves, and the microcomputer detects the number of the capstan frequency generating signals during the prescribed period of time. In order to equalize the number of the capstan frequency generating signals to the predetermined numerals for each speed mode, t6 value is controlled and consequently the stop points are kept consistent in a slow speed reproduction mode, thereby preventing noise.

BRIEF DESCRIPTION OF THE DRAWINGS

FIGS. 4A to 4C show a slow coordinate track system in a SP mode, wherein FIG. 4A illustrates the case where noise is not generated, FIG. 4B illustrates the case where noise is generated at the upper portion, and FIG. 4C illustrates the case where noise is generated at the lower portion.

DETAILED DESCRIPTION OF THE INVENTION

Figure 1:
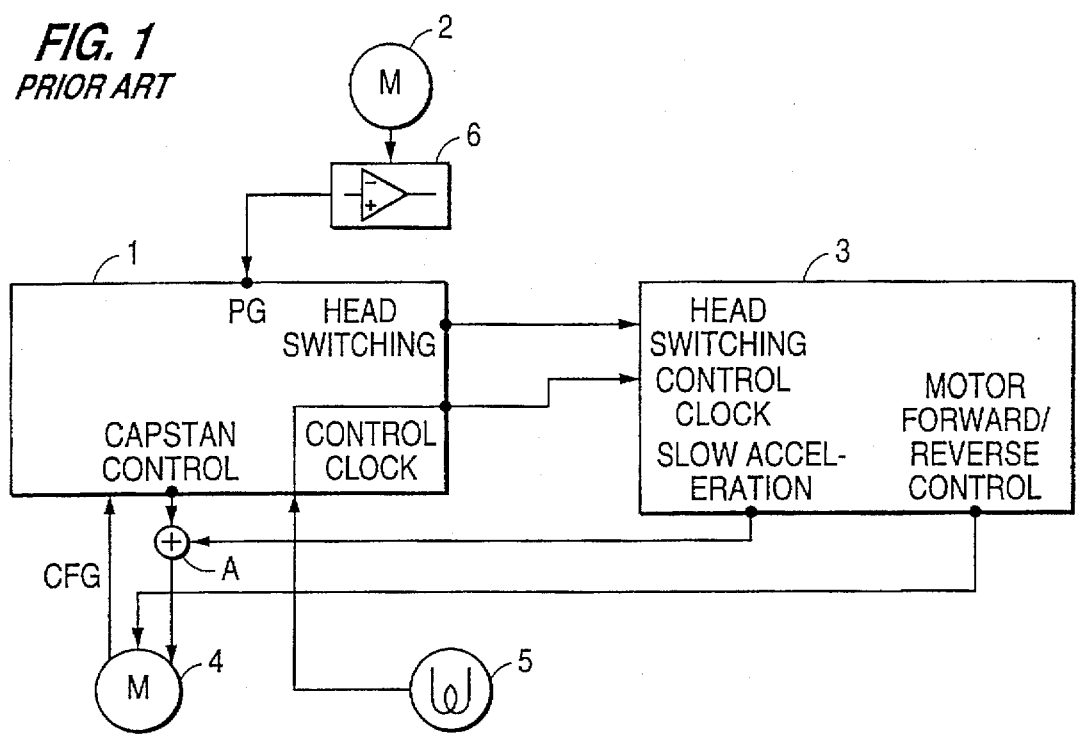
FIG. 1 is a block diagram of a conventional deck system in a slow speed reproduction mode.
Figure 2:
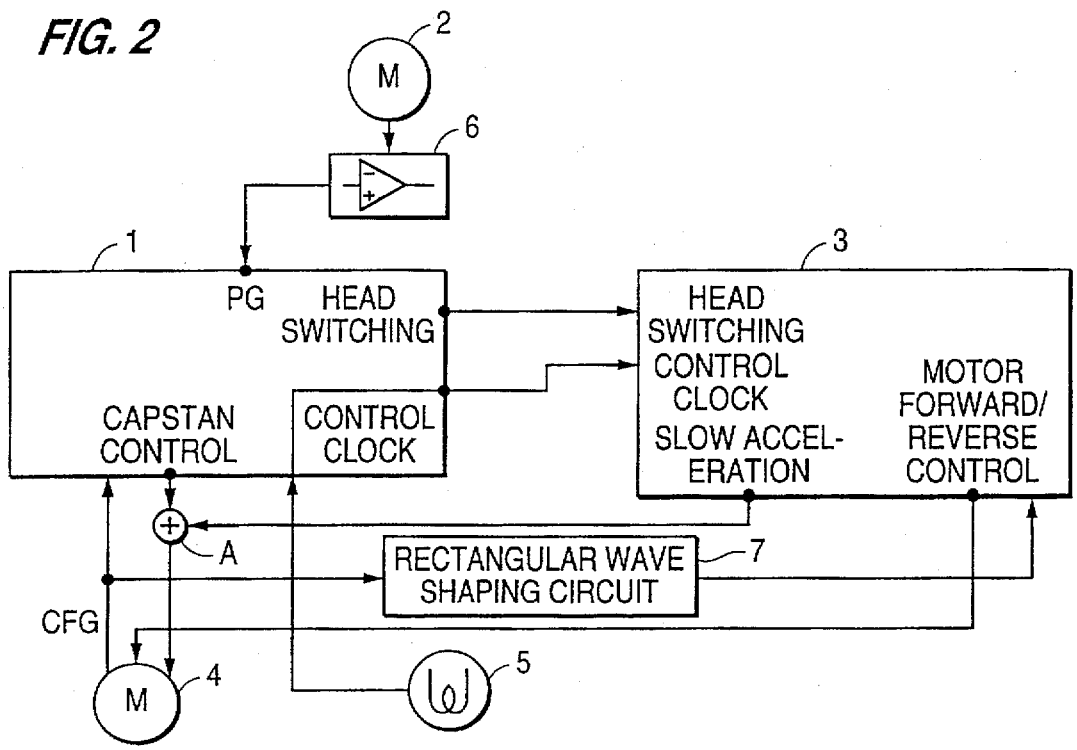
FIG. 2 is a block diagram of an apparatus for correcting capstan load in a slow speed reproduction mode according to the present invention.
Figure 3:
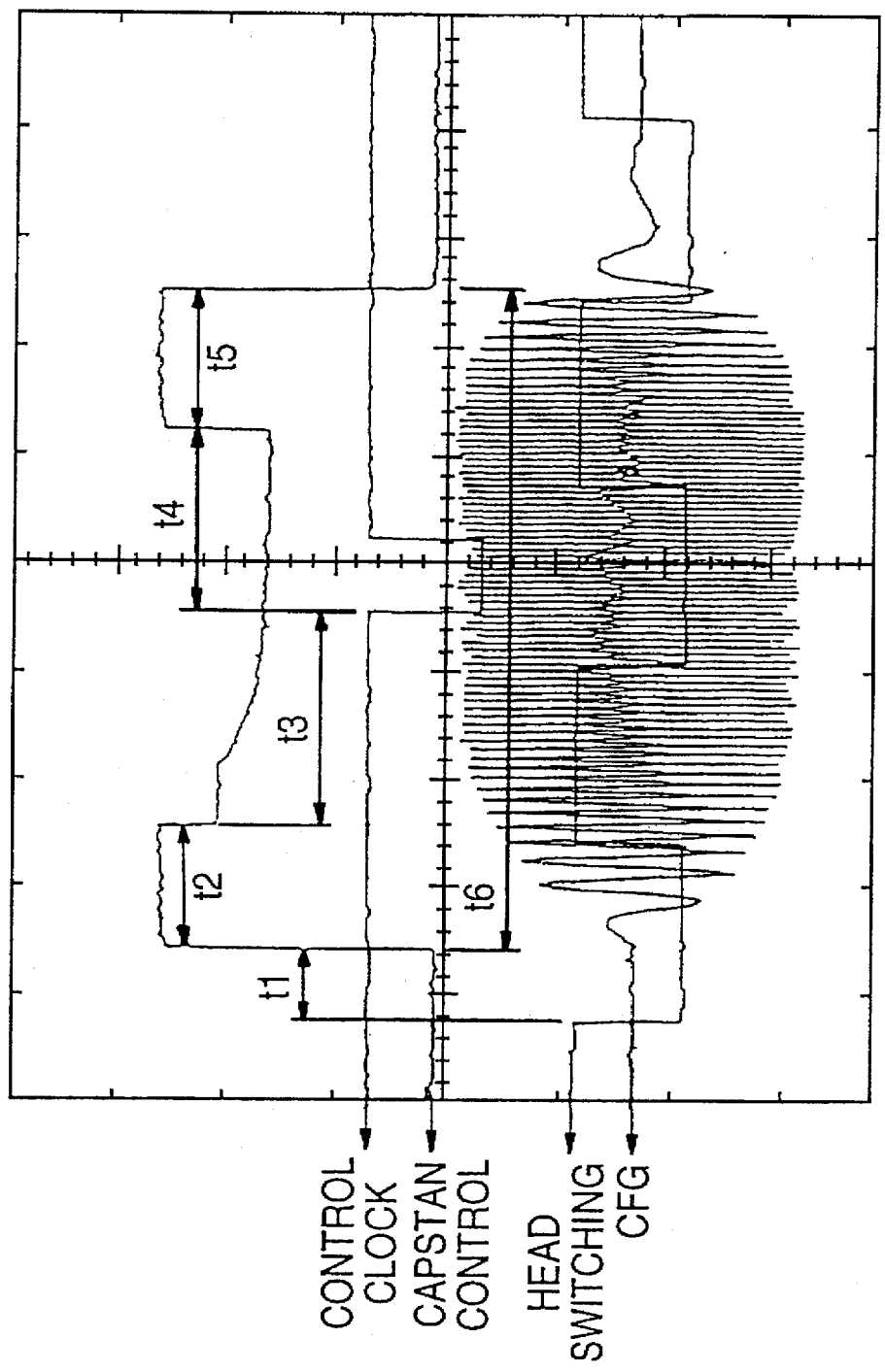
FIG. 3 is a waveform diagram showing control signals in a slow speed reproduction mode.

A preferred embodiment of the present invention is described in detail hereinafter with reference to FIG. 2.

An apparatus for correcting capstan load in a slow speed reproduction mode according to the present invention comprises (a) a rectangular wave shaping circuit 7 for receiving capstan frequency generating signals CFG from a capstan motor 4 and shaping rectangular waves corresponding to the capstan frequency generating signals CFG, (b) a microcomputer 3, which is connected through a slow acceleration terminal and a motor forward/reverse control terminal to the capstan motor 4, for detecting the number of the capstan frequency generating signals CFG during a prescribed period of time, by receiving the rectangular waves outputted from the rectangular wave shaping circuit 7, (c) a servo 1, which is connected through a head switching terminal and a control clock terminal to the microcomputer 3, for controlling the capstan motor 4 through a capstan control terminal, (d) a control head 5 connected to the control clock terminal of the servo 1, and (e) a drum motor 2 connected through a pulse generating amplifier 6 to a pulse generator PG of the servo 1.

In the above-mentioned apparatus for correcting capstan load in a slow speed reproduction mode according to the present invention, if a user commands a commencement of a slow speed reproducing function, the rectangular wave shaping circuit 7 shapes the capstan frequency generating signals CFG, generated according to the rotation of the capstan motor 4, into the rectangular waves. The microcomputer 3 counts the number of the rectangular waves present, during a time interval t6, so that the number of the capstan frequency generating (CFG) signals which are generated are detected. In addition, the microcomputer 3 compares the number of the capstan frequency generating (CFG) signals with predetermined numerals for each speed mode, and controls the value of t4 on the basis of that result. Consequently, the number of the capstan frequency generating signals CFG become equal to those of the capstan frequency generating signals predetermined for each speed mode.

Figure 4B:
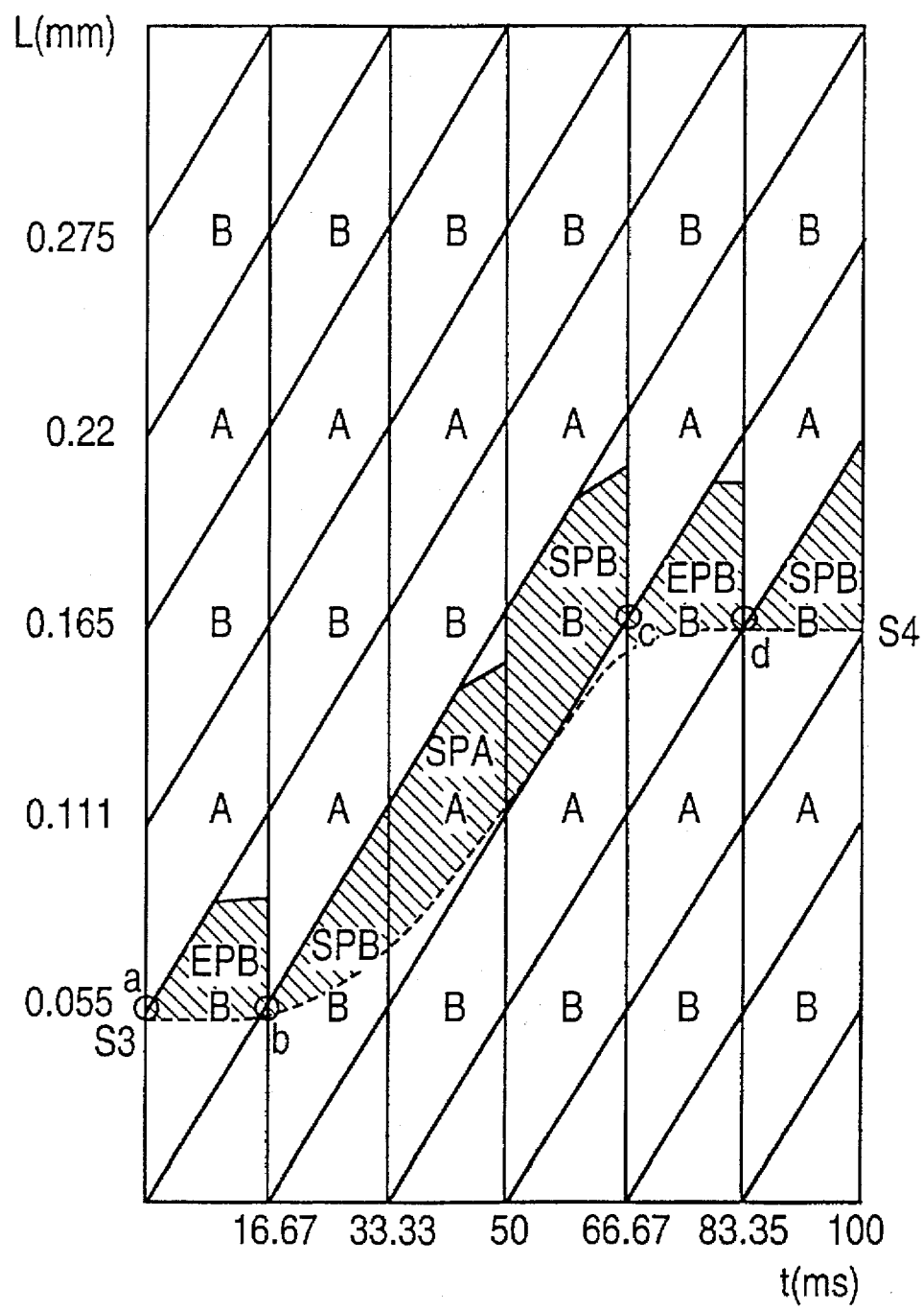
Figure 4C:
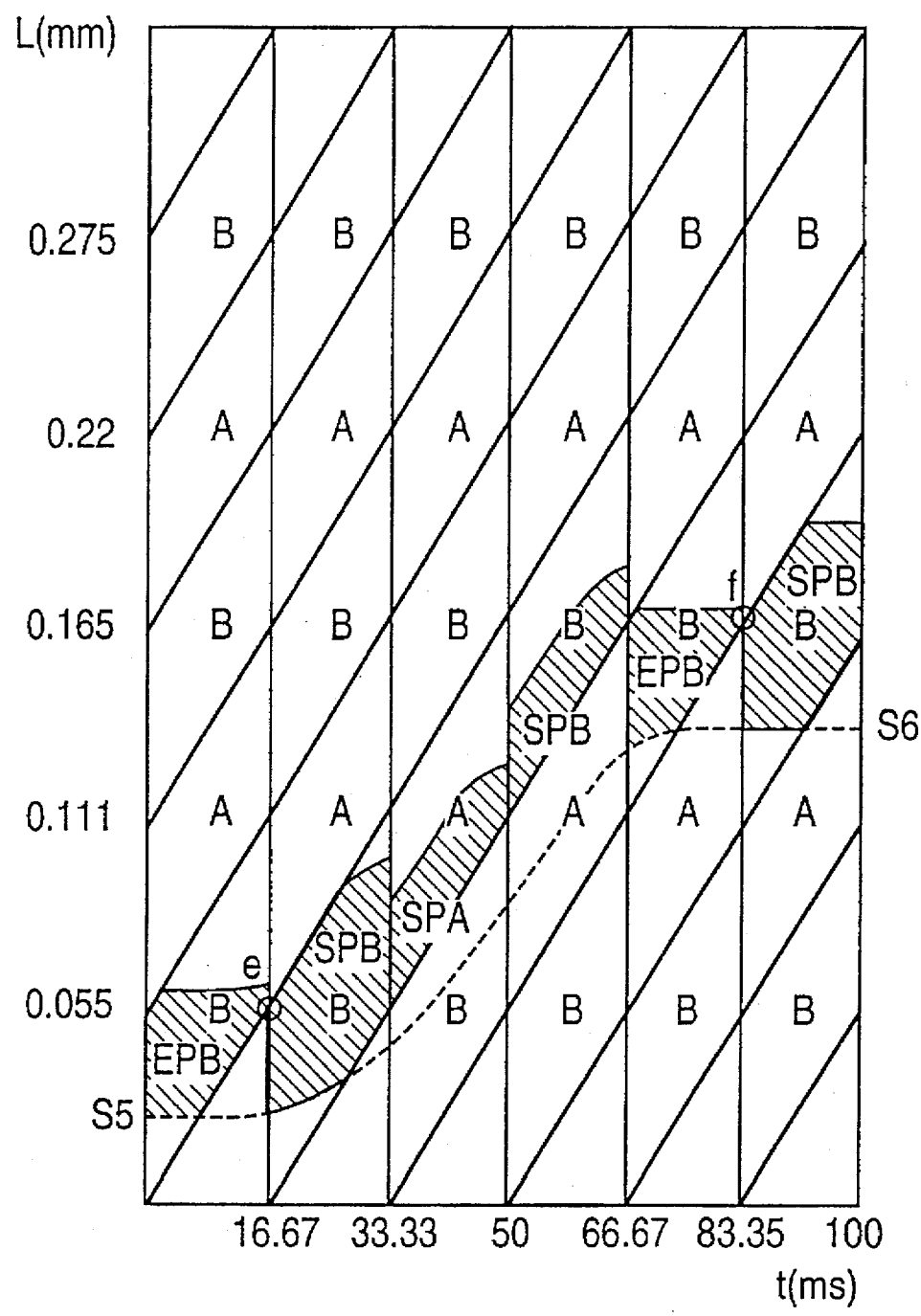

By making the number of the capstan frequency generating signals become equal to the predetermined number for each speed mode, the positions of S1 and S2 shown in FIG. 4A are kept perpetually consistent irrespective of a deck's load force.

Figure 5:
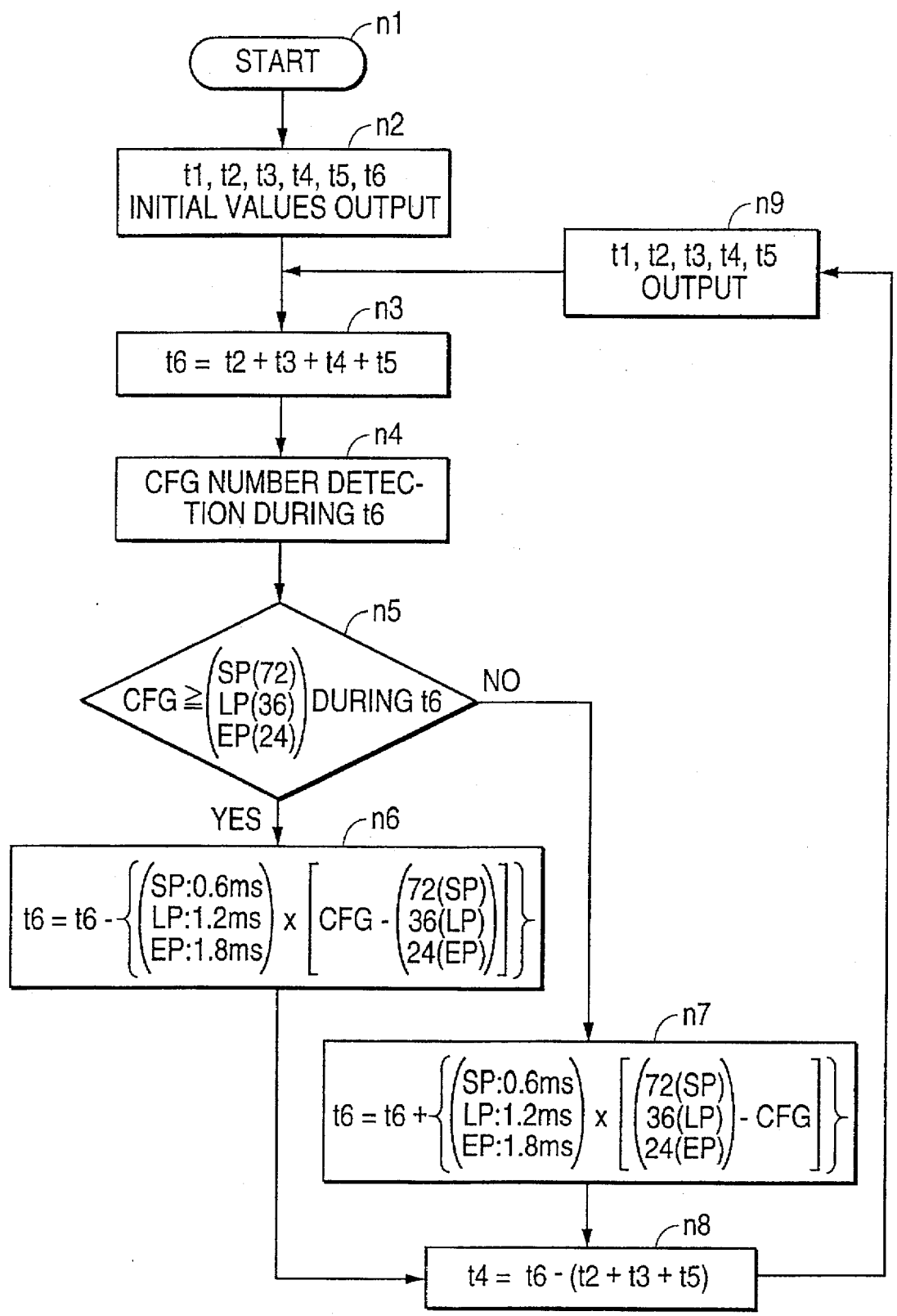
FIG. 5 is a flow chart explaining the operation of a microcomputer according to the present invention.

The operating program of the present invention is described hereinafter with reference to the flow chart of FIG. 5.

At the step n1, the slow speed reproducing function is commenced and then at the step n2, initial values of t1, t2, t3, t4, and t5 are outputted.

At the step n3, the value of t6 is obtained using the equation t6=t2+t3+t4+t5, and then at the step n4, the number of the capstan frequency generating signals CFG are detected during the t6 time interval.

At the step n5, the number of the capstan frequency generating signals CFG are compared with the predetermined numbers, for each speed mode. If the CFG number is larger or equal, program flow moves to the next step n6. On the contrary, if the CFG number is smaller, program flow moves to step n7.

At the step n6, a predetermined time value for each speed mode is multiplied by the difference between the number of the capstan frequency generating signals CFG during the t6 time interval and the predetermined numbers for each speed mode. Then, after the resultant value is subtracted from the t6 value, program flow moves to the next step n8. At the step n7, the predetermined time value for each speed mode is multiplied by the difference between the number of the capstan frequency generating signals CFG during the t6 time interval and the predetermined numbers for each speed mode. Next, after the resultant value is added to the t6 value, program flow moves to the next step n8. At this time, an initial correction amount has twice as many error values, and succeeding correction amounts are the above-described resultant value.

At the step n8, t4 value is obtained by an equation t4=t6−(t2+t3+t5), and then the t1, t2, t3, t4, and t5 values are outputted at the step n9. From step A9, program flow moves to step n3, where the above-mentioned procedure is repeated.

If a slow speed reproduction stop signal is inputted, an interruption function, which takes priority to all functions, is operated, thereby stopping the slow speed reproducing function.

In the above-mentioned present invention, since the stop points in a slow speed reproduction mode are corrected according to the load difference of the deck mechanism, the above discussed problem of the deck mechanism is overcome, thereby removing the problem in a slow speed reproduction mode of a VCR. That is, noise is suppressed during the operation of the slow speed reproducing function by keeping the stop points consistent during a slow speed reproduction mode.

While specific embodiments of the invention have been illustrated and described wherein, it is to be realized that modifications and changes will occur to those skilled in the art. It is therefore to be understood that the appended claims are intended to cover all modifications and changes as fall within the true spirit and scope of the invention.

What is claimed is:

1. A method for correcting a capstan load in a slow speed reproduction mode, comprising the steps of:

outputting initial values of first, second, third, fourth, and fifth operational time intervals for a capstan motor;

obtaining a sixth operational time interval for the capstan motor by summing the first through fifth operational time intervals;

detecting the number of capstan frequency generating signals generated from the capstan motor during the obtained sixth operational time interval;

comparing the detected number of the capstan frequency generating signals with a predetermined number for each speed mode;

calculating a new sixth operational time interval for the capstan motor based on the comparison result; and correcting the capstan load based on the calculation result.

2. A method according to claim 1, wherein the first operational time interval includes a time interval from a trailing edge of a head switching signal to a leading edge of a capstan control signal, the second operational time interval includes a time interval for actuating the capstan motor, the third operational time interval includes a time interval from a starting point of the capstan motor to a point of detecting a control clock signal, the fourth operational time interval includes a time interval from the detection point of the control clock signal to an input time of a stop pulse for stopping the capstan motor, and the fifth operational time interval includes a time interval from an input of the stop pulse to an actual stop of the capstan motor.

3. A method according to claim 1, wherein the calculating step includes the steps of:

determining a difference between the detected number of the capstan frequency generating signals and the predetermined number for each speed mode; and multiplying the difference by a predetermined time value for each speed mode.

4. A method according to claim 3, wherein the determining step includes the step of:

subtracting the predetermined number from the detected number of the capstan frequency generating signals for each speed mode, when the detected number of the capstan frequency generating signals is greater than or equal to the predetermined number for each speed mode.

5. A method according to claim 3, wherein the determining step includes the step of:

subtracting the detected number of the capstan frequency generating signals from the predetermined number for each speed mode, when the detected number of the capstan frequency generating signals is less than the predetermined number for each speed mode.

6. A method according to claim 3, wherein the calculating step includes the step of:

determining the new sixth operational time interval by subtracting the multiplied difference obtained in the multiplying step from the six operational time interval obtained in the obtaining step, when the detected number of the capstan frequency generating signals is greater than or equal to the predetermined number for each speed mode.

7. A method according to claim 3, wherein the calculating step includes the step of:

determining the new sixth operational time interval by adding the multiplied difference obtained in the multiplying step to the six operational time interval obtained in the obtaining step, when the detected number of the capstan frequency generating signals is less than the predetermined number for each speed mode.

8. A method according to claim 1, wherein the correcting step includes the steps of:

obtaining a total operational time interval for the capstan motor based on the comparison result by summing a plurality of initial operational time intervals for the capstan motor; and determining a new fourth operational time interval using the obtained total operational time interval to correct the capstan load.

9. A method according to claim 8, wherein the determining step includes the step of:

subtracting the second, third, and fifth operational time intervals from the total operational time interval.

10. An apparatus for correcting a capstan load in a slow speed reproduction mode of a video cassette recorder having a capstan motor for outputting capstan frequency generating signals, the apparatus comprising;

wave shaping means for shaping the capstan frequency generating signals generated by the capstan motor into wave shaped capstan frequency generating signals;

detection means for detecting the number of the wave shaped capstan frequency generating signals for a predetermined period, the detection means outputting initial values of first through fifth operational time intervals for the capstan motor, obtaining a sixth operational time interval for the capstan motor by summing the first through fifth operational time intervals, and detecting the number of the capstan frequency generating signals during the obtained sixth operational time interval;

comparison means for comparing the detected number of the wave shaped capstan frequency generating signals with a predetermined number; and control means for calculating operational time intervals for the capstan motor based on the comparison result and compensating the calculated operational time intervals to correct the capstan load.

11. An apparatus according to claim 10, wherein the first operational time interval includes a time interval from a trailing edge of a head switching signal to a leading edge of a capstan control signal, the second operational time interval includes a time interval for actuating the capstan motor, the third operational time interval includes a time interval from a starting point of the capstan motor to a point of detecting a control clock signal, the fourth operational time interval includes a time interval from the detection point of the control clock signal to an input time of a stop pulse for stopping the capstan motor, and the fifth operational time interval includes a time interval from an input of the stop pulse to an actual stop of the capstan motor.

12. An apparatus according to claim 10, further comprising:

servo means for outputting a capstan control signal, a control clock pulse, and a head switching pulse; and a microcomputer for receiving the control clock pulse and the head switching pulse and outputting a slow acceleration signal and a motor forward/reverse control signal for the slow speed reproduction mode.

13. An apparatus according to claim 12, further comprising:

a control head connected to a control clock terminal of the servo means; and a drum motor connected through a pulse generating amplifier to a pulse generator of the servo means.

14. An apparatus according to claim 10, wherein the control means subtracts the predetermined number from the detected number of the capstan frequency generating signals for each speed mode, when the detected number of the capstan frequency generating signals is greater than or equal to the predetermined number for each speed mode.

15. An apparatus according to claim 10, wherein the control means subtracts the detected number of the capstan frequency generating signals from the predetermined number for each speed mode, when the detected number of the capstan frequency generating signals is less than the predetermined number for each speed mode.

16. An apparatus according to claim 10, wherein the control means determines a difference between the detected number of the capstan frequency generating signals and the predetermined number, and multiplies the difference by a predetermined time value for each speed mode.

17. An apparatus according to claim 16, wherein the control means determines a new total operational time interval for the capstan motor by subtracting the multiplied difference from a previous total operational time interval for the capstan motor, when the detected number of the capstan frequency generating signals is greater than or equal to the predetermined number for each speed mode.

18. An apparatus according to claim 16, wherein the control means determines a new total operational time interval for the capstan motor by adding the multiplied difference to a previous total operational time interval for the capstan motor, when the detected number of the capstan frequency generating signals is less than the predetermined number for each speed mode.

19. An apparatus according to claim 10, wherein the control means obtains a total operational time interval for the capstan motor based on the comparison result by summing a plurality of initial operational time intervals for the capstan motor, and determines a new fourth operational time interval using the obtained total operational time interval to compensate the sixth operational time interval.

* * * * *